C. M. HANSEN.
TRANSMISSION GEARING.
APPLICATION FILED JULY 9, 1910.
999,027.
Patented July 25, 1911.
2 SHEETS—SHEET 1.
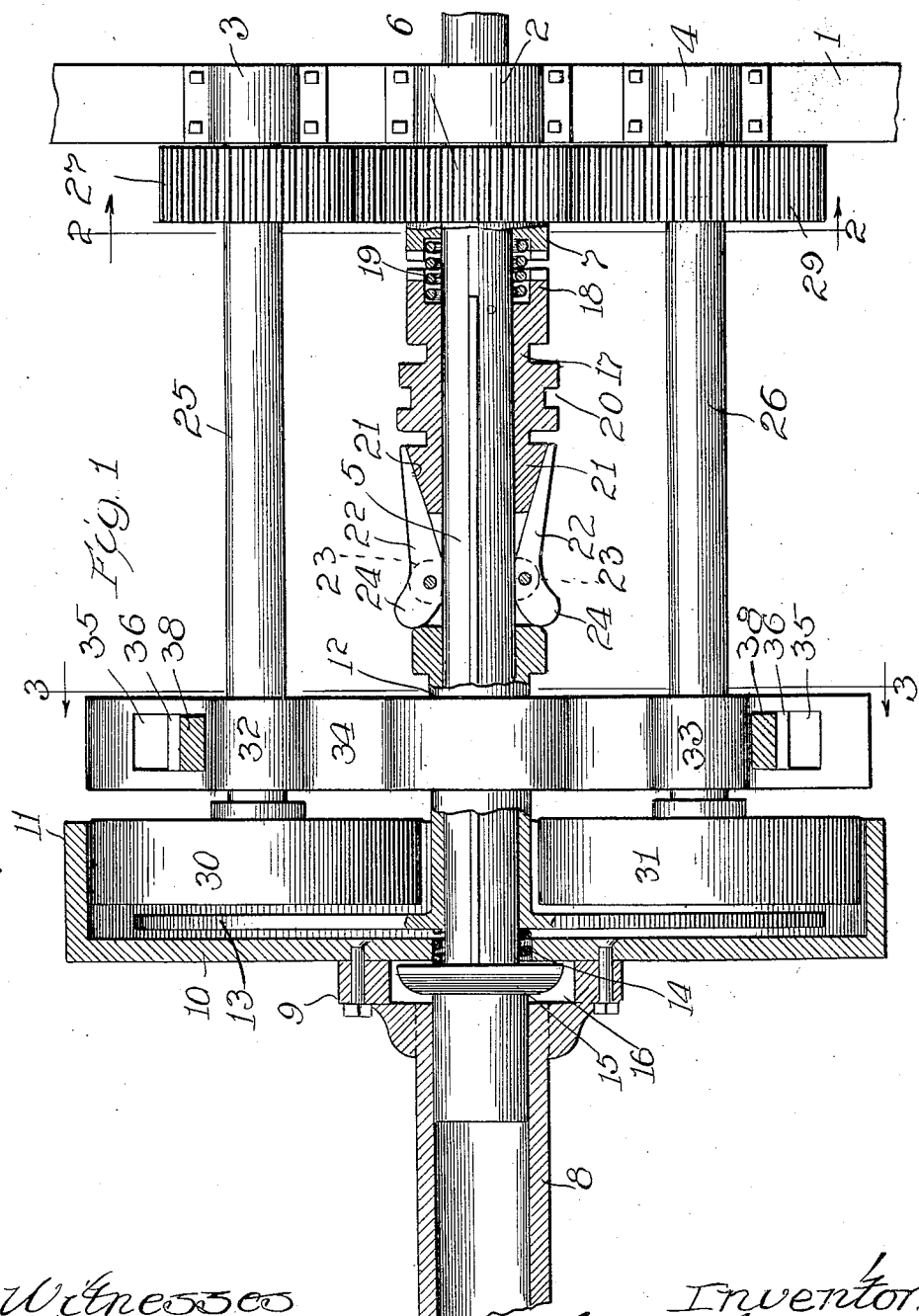

C. M. HANSEN.
TRANSMISSION GEARING.
APPLICATION FILED JULY 9, 1910.
999,027.
Patented July 25, 1911.
2 SHEETS—SHEET 2.
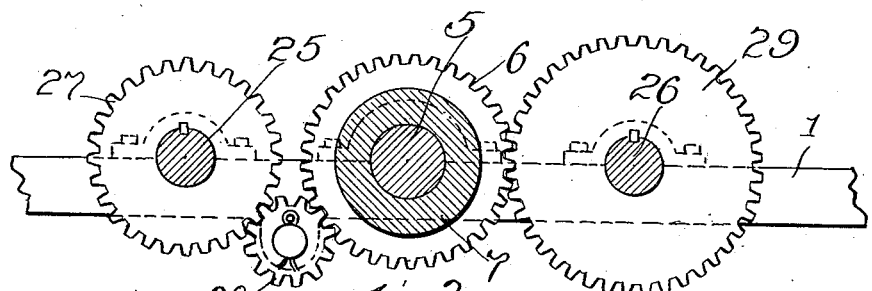
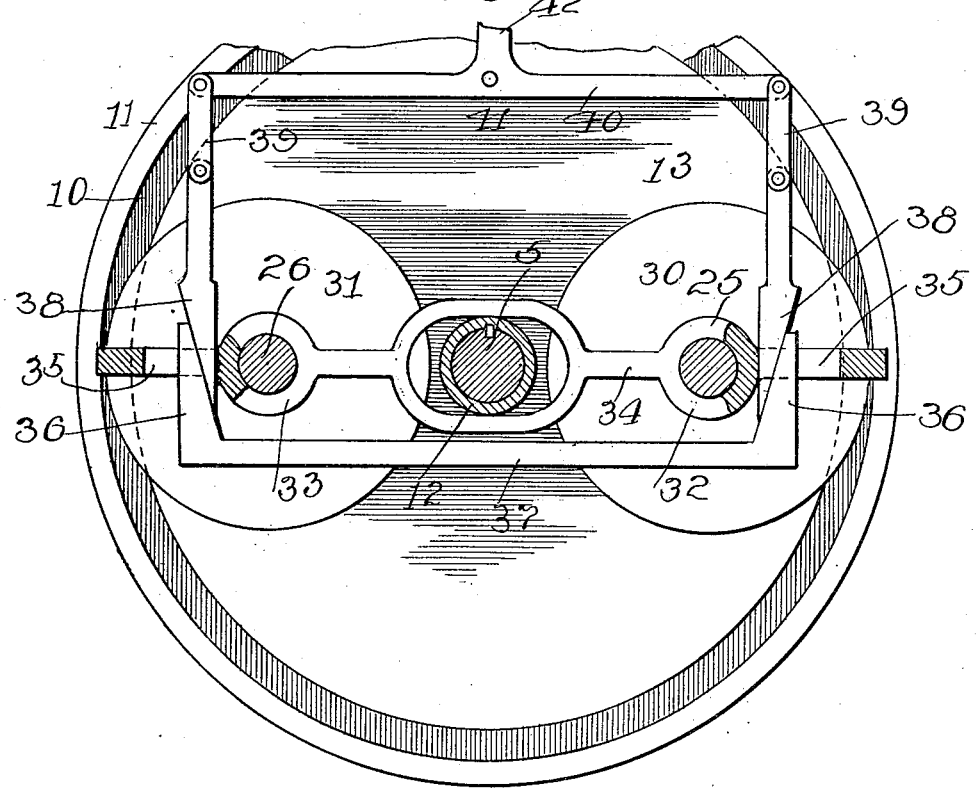

mark# UNITED STATES PATENT OFFICE.

CHRISTIAN M. HANSEN, OF CHICAGO, ILLINOIS.

TRANSMISSION-GEARING.

999,027.  Specification of Letters Patent.  Patented July 25, 1911.

Application filed July 9, 1910. Serial No. 571,161.

*To all whom it may concern:*

Be it known that I, CHRISTIAN M. HANSEN, citizen of the United States, residing at Chicago, in the county of Cook and State of Illinois, have invented certain new and useful Improvements in Transmission-Gearing; and I do hereby declare the following to be a full, clear, and exact description of the invention, such as will enable others skilled in the art to which it appertains to make and use the same.

This invention relates to a novel construction in a transmission gearing particularly adapted for use on motor propelled vehicles, the object being to provide a simple and efficient device of this character by means of which the direction of movement of the vehicle may be reversed without reversing the engine propelling the same, and which furthermore occupies very small space and is easily operated, and consists in the features of construction and combinations of parts hereinafter fully described and claimed.

In the accompanying drawings illustrating this invention: Figure —1— is a view partly in section and partly in elevation of a transmission gearing constructed in accordance with my invention. Fig. —2— is a transverse section of the same on the line 2—2 of Fig. —1— showing the gears employed. Fig. —3— is a transverse section on the line 3—3 of Fig. —1— showing the friction disks and mechanism controlling the same.

My invention relates to that class of transmission gearing usually known as friction gearing. In motor driven vehicles it is usually desirable that the speed of the vehicle may be changed without varying the speed of the motor and that the same may be reversed without reversing the motor. My present transmission gearing is intended to efficiently accomplish these several ends and is particularly intended to occupy very little space so that the same may be mounted where the space for the same is necessarily very limited as it usually is in all motor propelled vehicles.

In the accompanying drawings I have shown at —1— a part of the frame of a motor driven vehicle upon which a plurality of bearings —2—, —3— and —4— are mounted. Through the bearing —2— the motor shaft —5— passes, the latter being equipped adjacent said bearing with a loose spur gear —6— having a hub —7— constituting one member of a toothed clutch. The said shaft —5— is journaled at its other end in a sleeve or hollow shaft —8— which is suitably journaled in bearings on the frame of the machine, the latter being omitted from illustration. Rigid with said sleeve —8— is a flange —9— to which a friction disk —10— is bolted or otherwise suitably secured. Said friction disk is provided with an annular flange —11—, the inner face of which is adapted to be frictionally engaged as will be hereinafter described. Splined upon said shaft —5— and longitudinally movable thereon is a sleeve —12— terminating at one end in a disk —13— opposing the inner face of the disk —10— and adapted to frictionally engage the latter to rotate the same with said shaft —5—. A coiled spring —14— is interposed between one end of said sleeve —12— and a collar —15— on said shaft, the latter projecting into the annular space —16— within said annular flange —9—; said spring being adapted to maintain said disk —13— normally separated or out of contact with said disk —10—. Splined upon said shaft —5— is a sleeve —17—, the latter terminating at one end in a toothed annular flange —18— adapted to engage the toothed hub —7— of said gear —6— to clutch the latter rigid with said shaft —5— to rotate therewith. A spring —19— interposed between said hub —7— and the contiguous end of said sleeve —17— is adapted to maintain said clutch —18— —7— normally released. Said sleeve —17— is provided between its ends with an annular groove —2— for the reception of the ends of a forked lever by means of which the same is moved longitudinally on said shaft, said lever being omitted from illustration as superfluous. At its other end said sleeve —17— terminates in a cone —21— upon which the ends of levers —22— bear, the latter being pivotally secured between their ends between several pairs of ears —23— on said shaft —5— and terminate at their other ends in arms —24— bearing upon one end of said sleeve —12—, said levers when turned on their pivots by movement of the sleeve —17— toward the same being adapted to bear at their cam ends upon the end of said sleeve —12— and move the same longitudinally on said shaft against the action of said spring —14— thereby throwing the disk —13— into contact with the opposing face of the disk —10—.

In the bearings —3— and —4— the countershafts —25— and —26— respectively, are journaled at one end. The former is equipped adjacent said bearing —3— with a spur gear —27— meshing with an idler —28— rotatably mounted on a stud on the part —1— of the frame and which in turn meshes with said gear —6— so that when said sleeve —17— is moved in a direction to engage the clutch —18— —7—, said shaft —25— will be rotated in the same direction as said shaft —5—. The said shaft —26— is equipped adjacent said bearing —4— with a spur gear —29— meshing with said spur gear —6— and adapted when said clutch —18— —7— is engaged to be rotated in the opposite direction from said shafts —5— and 25. Said shafts —25— and —26— are equipped at their outer ends with friction wheels —30— and —31— respectively, adapted to contact with the inner face of said flange —11— of the disk —10— to impart movement to said shaft —8— either in the same or in the opposite direction from the shaft —5— but at less speed. The said shafts —25— and —26— pass through bearings —32— and —33— respectively, integral with a member —34— provided in its end portions with slots —35— into which the flanges —36— of a member —37— rigidly mounted on the frame of the machine project. The opposing faces of said flanges —36— are beveled and are adapted to be engaged by the beveled faces of wedges —38— which latter bear on their straight faces against the inner end walls of said slots —35—, said member —34— being adapted to be moved relatively to said member —37— by vertical movement imparted to said wedges —38—. The latter are connected by means of links —39— with opposite ends of a beam lever —40— pivotally mounted at —41— upon the frame of the machine and provided with a stem —42— by means of which it may be rocked to raise one of said wedges —38— simultaneously with the lowering of the other and thereby imparting longitudinal movement in either direction to said member —34—, the latter when moved in one direction throwing one of said disks —30— or —31— into contact with the inner face of the flange —11— and simultaneously throwing the other out of such contact as will be obvious. Said member —34— is provided between its ends with an elongated slot through which the sleeve —12— passes. It will be noted that the said gear —29— is of larger diameter than the gear —6— so that said shaft —26— will rotate more slowly than the said shaft —5—. When said clutch —18— —7— is engaged and said friction wheel —31— is thrown into contact with the inner face of the flange —11— the said shaft —8— will be rotated relatively slowly compared to the speed of the shaft —5— and in the opposite direction therefrom to reverse the direction of travel of the vehicle. When the friction wheel —30— is thrown into contact with said flange —11— and the friction wheel —31— simultaneously thrown out of such contact the shaft —8— will be rotated in the same direction as the shaft —5— but at less speed though such speed will be greater than the speed of the reversed gear for the reason that the spur gear —27— is of smaller diameter than said gear —6—. So long as the clutch —18— —7— is engaged the said disk —13— will be maintained out of surface contact with the disk —10— but by moving said sleeve —17— in a direction to disengage the clutch —18— —7— and continuing this movement until the long ends of the levers —22— are raised by the wedge action of the cone —21— said sleeve will be moved toward said disk —10— and the disk —13— thus thrown into surface contact therewith thereby causing the said shaft —8— to rotate in the same direction and at the same speed as said shaft —5—. It will be noted that the said disk —10— always rotates in the same direction as the friction wheel engaged therewith. Owing to the fact that the friction wheels —30— and —31— are disposed inwardly of the flange —11— the surfaces in contact will be greater in area than would be the case were said friction wheels disposed outwardly of said flange —11— so as to bear on the outer face thereof. In view of the greater area of contact and further cause the two parts to rotate in the same direction I am enabled to transmit greater power by means of relatively small parts than would be the case were the convex faces of the parts opposed and the amount of space occupied is, of course, further lessened by the fact that the driving friction wheels are disposed within the driven wheels so that I am enabled to economize space to the utmost degree.

The mechanism controlling the engagement of the friction wheels —30— and —31— with the flange —11— is shown relatively diagrammatically and is intended only to illustrate one method of imparting requisite movement to said member —34—, it being understood that any other suitable means for imparting such movement may be substituted.

I claim as my invention:

1. A transmission gearing comprising in combination, a driving shaft, a member rotatably rigid therewith, at least one countershaft arranged parallel with said driving shaft, a member rigid with said countershaft, gearing between said countershaft and said driving shaft, a shaft to be driven disposed in axial alinement with said driving shaft, a member rotatably rigid therewith and adapted to be engaged by said respective member on said driving shaft and said countershaft to drive said shaft to be driven at different speeds, and means controlling the engagement of said respective members on said driving shaft and said countershaft with said member on said shaft to be driven whereby only one at a time of said first-named members may be brought into actuating relation to the last-named members.

2. A transmission gearing comprising in combination, a driving shaft, a shaft to be driven disposed in axial alinement therewith, a member on each of said shafts non-rotatable relatively thereto and movable relatively to and adapted to engage each other to cause said shafts to rotate in unison, at least one countershaft disposed parallel with said driving shaft and geared thereto, a member rigid with said countershaft and adapted to engage said member on said shaft to be driven to drive the latter, and means for throwing either of said members on said driving shaft and said countershaft respectively into actuating relation to said member on said shaft to be driven.

3. A transmission gearing comprising in combination, a driving shaft, a shaft to be driven disposed in axial alinement therewith, a member on each of said shafts non-rotatable relatively thereto and movable relatively to and adapted to engage each other to cause said shafts to rotate in unison, at least one countershaft disposed parallel with said driving shaft and geared thereto, a member rigid with said countershaft and adapted to engage said member on said shaft to be driven to drive the latter, a clutch controlling said gearing, means on said driving shaft for throwing the member carried thereby into actuating relation to said member on said shaft to be driven, and a single lever controlling said clutch and said last-named means for releasing one thereof when the other is engaged.

4. A transmission gearing comprising in combination, a driving shaft, a shaft to be driven disposed in axial alinement therewith, a member on each of said shafts non-rotatable relatively thereto and movable relatively to and adapted to engage each other to cause said shafts to rotate in unison, at least one countershaft disposed parallel with said driving shaft and geared thereto, a member rigid with said countershaft and adapted to engage said member on said shaft to be driven to drive the latter, means for imparting movement to said countershaft relatively to said driving shaft to throw the member thereon into actuating relation to said member on said shaft to be driven, means for imparting relative movement to said members on said driving shaft and said shaft to be driven, and a clutch controlling the gearing between said driven shaft and said countershaft, said clutch controlled by said last-named means.

5. A transmission gearing comprising in combination, a driving shaft, a shaft to be driven disposed in axial alinement therewith, a member on each of said shafts non-rotatable relatively thereto and movable relatively to and adapted to engage each other to cause said shafts to rotate in unison, at least one countershaft disposed parallel with said driving shaft and geared thereto, a member rigid with said countershaft and adapted to engage said member on said shaft to be driven to drive the latter, means for imparting movement to said countershaft relatively to said driving shaft to throw the member thereon into actuating relation to said member on said shaft to be driven, means for moving said member on said driving shaft longitudinally thereof to throw the same into actuating relation to said member on said shaft to be driven, and a clutch controlling said gearing between said driving shaft and said countershaft, one member of said clutch movable longitudinally of said driving shaft and actuating said last-named means when moved in one direction.

6. A transmission gearing comprising in combination, a driven shaft, a shaft to be driven disposed in axial alinement therewith, a clutch member rigid therewith, a clutch member on said driving shaft non-rotatable relatively thereto and adapted to be moved longitudinally thereof to engage said clutch member on said countershaft, two countershafts disposed parallel with said driving shaft and geared thereto to be rotated in respectively opposite directions, a member rigid with each of said countershafts adapted to engage said clutch member on said shaft to be driven to rotate the latter, means controlling the engagement of said last-named members with said clutch member to release one thereof when the other is engaged, a clutch controlling the gearing between said driving shaft and said countershafts, and means actuated by one member of said last-named clutch member on said driving shaft into engagement with said member on said shaft to be driven.

7. A transmission gearing comprising in combination a shaft to be driven, a member rigid therewith, a driving shaft, a plurality of countershafts geared thereto, a member on each of said last-named shafts adapted to engage said member on said shaft to be driven to rotate the latter at various speeds, and means controlling the engagement of said respective members with said member on said first-named shaft whereby only one at a time of said members actuates the said shaft to be driven.

8. A transmission gearing comprising in combination a shaft to be driven, a member rigid therewith, a driving shaft, a plurality of countershafts geared thereto, a member on each of said last-named shafts adapted to engage said member on said shaft to be driven to rotate the latter at various speeds, and in opposite directions, and means controlling the engagement of said respective members with said member on said first-named shaft whereby only one at a time of said members actuates the said shaft to be driven.

9. A transmission gearing comprising in combination, the driving shaft, a plurality of countershafts geared thereto to rotate in respectively opposite directions, a friction disk splined on said driving shaft and longitudinally movable thereon, a driven shaft disposed in axial alinement with said driving shaft, a friction disk thereon opposing the disk on said driving shaft and having an annular flange, friction wheels on said first-named countershafts peripherally opposing the inner face of said annular flange, means common to both countershafts for simultaneously imparting lateral movement thereto to throw one of said friction wheels into engagement with said flange of said friction wheel and simultaneously throwing the other out of engagement, and means for imparting longitudinal movement to said disk on said driving shaft to throw the same into engagement with said disk on said driven shaft.

10. A transmission gearing comprising in combination, a driving shaft, a pair of countershafts disposed on either side thereof and geared thereto to rotate in respectively opposite directions, a clutch controlling said gearing, a friction wheel on each of said countershafts, a friction disk on said driving shaft, a driven shaft disposed in axial alinement with said driving shaft, a friction disk thereon opposing the disk on said driving shaft and having an annular flange, opposing the peripheries of said friction wheels on its inner face, means common to both said first-named countershafts for imparting lateral movement thereto simultaneously to engage either of said friction wheels with said flange, and means for imparting relative movement to said friction disks for engaging the same with each other, said means controlling said clutch.

11. A transmission gearing comprising in combination, a driving shaft, a pair of countershafts disposed on either side thereof and geared thereto to rotate in respectively opposite directions, a clutch controlling said gearing, a friction wheel on each of said countershafts, a friction disk on said driving shaft, a driven shaft disposed in axial alinement with said driving shaft, a friction disk thereon opposing the disk on said driving shaft, and having an annular flange opposing the peripheries of said friction wheels on its inner face, means common to both said first-named countershafts for imparting lateral movement thereto simultaneously to engage either of said friction wheels with said flange, and means for imparting relative movement to said friction disks longitudinally relatively to said driving shaft for engaging the same with each other, said means controlling said clutch.

12. A transmission gearing comprising in combination, the driving shaft, a plurality of countershafts geared thereto to rotate in respectively opposite directions, a friction disk splined on said driving shaft and longitudinally movable thereon, a driven shaft disposed in axial alinement with said driving shaft, a friction disk thereon opposing the disk on said driving shaft, and having an annular flange, friction wheels on said first-named countershafts peripherally opposing the inner face of said annular flange, means common to both said countershafts for simultaneously imparting lateral movement thereto to throw one of said friction wheels into engagement with said flange of said friction wheel and simultaneously throwing the other out of engagement, a clutch controlling the gearing between said driving shaft and said first-named countershaft, and a member rotatably rigid with said driving shaft and longitudinally movable thereon constituting a part of said clutch and controlling the longitudinal movement of said friction disk and adapted when moved in one direction to engage said clutch to rotate said first-named countershafts, and when moved in the opposite direction to engage said friction disks with each other.

In testimony whereof I have signed my name in presence of two subscribing witnesses.

CHRISTIAN M. HANSEN.

Witnesses:
RUDOLPH WM. LOTZ,
M. M. BOYLE.

---

Copies of this patent may be obtained for five cents each, by addressing the "Commissioner of Patents, Washington, D. C."